United States Patent
Ono et al.

(10) Patent No.: US 7,440,066 B2
(45) Date of Patent: Oct. 21, 2008

(54) LIQUID CRYSTAL DISPLAY DEVICE

(75) Inventors: Kikuo Ono, Mobara (JP); Ryutaro Oke, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 0 days.

(21) Appl. No.: 11/822,396

(22) Filed: Jul. 5, 2007

(65) Prior Publication Data

US 2007/0258019 A1    Nov. 8, 2007

Related U.S. Application Data

(62) Division of application No. 10/893,437, filed on Jul. 19, 2004, now Pat. No. 7,256,852.

(30) Foreign Application Priority Data

Aug. 29, 2003    (JP) .............................. 2003-209552

(51) Int. Cl.
  *G02F 1/1368*   (2006.01)
  *G02F 1/139*    (2006.01)
(52) U.S. Cl. ............................ 349/141; 349/39; 349/48
(58) Field of Classification Search .................. 349/38, 349/39, 42, 43, 48, 138, 141; 345/92
See application file for complete search history.

(56) References Cited

U.S. PATENT DOCUMENTS

| | | | |
|---|---|---|---|
| 6,562,645 B2 | 5/2003 | Sung et al. | |
| 7,280,174 B2 * | 10/2007 | Park et al. | 349/114 |
| 2003/0128323 A1 * | 7/2003 | Matsumoto et al. | 349/141 |
| 2003/0133053 A1 | 7/2003 | Ono et al. | |

FOREIGN PATENT DOCUMENTS

JP    2000-338462    5/1999

* cited by examiner

*Primary Examiner*—Dung T. Nguyen
*Assistant Examiner*—Tai Duong
(74) *Attorney, Agent, or Firm*—Reed Smith LLP; Stanley P. Fisher, Esq.; Juan Carlos A. Marquez, Esq.

(57) ABSTRACT

A liquid crystal display device includes a first electrode to which a signal is supplied through a first switching element and a second electrode to which a signal is supplied through a second switching element in each pixel region on a substrate, wherein liquid crystal is driven in response to a potential difference between the first electrode and the second electrode. In such a constitution, the first electrode is formed as one electrode of a first holding capacitance which is constituted by sandwiching an insulation film between the first electrode and a signal line and, at the same time, the second electrode is formed as one electrode of a second holding capacitance which is constituted by sandwiching an insulation film between the second electrode and a signal line.

6 Claims, 7 Drawing Sheets

LIQUID CRYSTAL DISPLAY DEVICE

CROSS-REFERENCE TO RELATED APPLICATIONS

This application is a Divisional application of U.S. application Ser. No. 10/893,437 filed Jul. 19, 2004 now U.S. Pat. No. 7,256,852. Priority is claimed based on U.S. application Ser. No. 10/893,437 filed Jul. 19, 2004, which claims the priority of Japanese Patent Application No. 2003-209552 filed Aug. 29, 2003, all of which is incorporated by reference.

BACKGROUND OF THE INVENTION

1. Field of the Invention

The present invention relates to a liquid crystal display device.

2. Description of the Related Art

There has been known a liquid crystal display device in which a pair of substrates are arranged to face each other in an opposed manner with liquid crystal therebetween, each one of pixel regions formed on a liquid-crystal-side of one substrate includes a pixel electrode and a counter electrode thereon and the optical transmissivity of the liquid crystal is controlled by generating an electric field between the pixel electrode and the counter electrode.

With respect to such a liquid crystal display device, there has been known a liquid crystal display device in which the above-mentioned respective electrodes are arranged by way of an insulation film, wherein one electrode is formed on the whole region of a center portion in the inside of the pixel region, while another electrode is formed as a group of electrodes which are overlapped to one electrode and have a so-called comb-teeth shape. Further, these electrodes are formed of a light transmitting conductive layer.

Such a liquid crystal display device is disclosed in JP-A-2002-90781 (or corresponding U.S. Pat. No. 6,562,645), for example.

Further, in JP-A-2000-338462, there has been disclosed a liquid crystal display device having the constitution in which a first video signal transmitted from the first drain signal line is supplied to one electrode through the first thin film transistor which is turned on in response to a scanning signal transmitted from a gate signal line, and a second video signal transmitted from the second drain signal line is supplied to another electrode through the second thin film transistor which is turned on in response to the above-mentioned scanning signal.

In the liquid crystal display device having such a constitution, two drain signal lines are arranged with respect to two thin film transistors formed in one pixel, wherein one voltage from one drain signal line is applied to one thin film transistor and another voltage from another drain signal line is applied to another thin film transistor. Here, one voltage assumes a positive pole and another voltage assumes a negative pole and these voltages constitute voltages in one frame period.

Due to such an operation, the differential voltage between the voltage of one electrode and the voltage of another electrode inside the pixel is applied to the liquid crystal. Further, to enable the AC driving of the liquid crystal voltage, the polarities of one electrode and another electrode are exchanged in the next frame period.

Due to such a constitution, compared to an in-plane switching type liquid crystal display device which arranges a thin film transistor in one pixel and in which the potential of a pixel electrode which is connected to the thin film transistor is, in a state that a potential of another electrode is fixed, subjected to AC driving with respect to the fixed voltage, the AC differential voltage can be halved.

In view of the above, it is possible to decrease the driving voltage of the liquid crystal and hence, the liquid crystal display device of low power consumption can be obtained.

SUMMARY OF THE INVENTION

However, even with the provision of such a constitution, when a screen of the liquid crystal display device becomes large-sized, the power consumption is increased. Further, when the pixel electrode is used as one electrode and the gate signal line or the capacitance signal line is used as another electrode, the liquid crystal display device assumes a mode in which only one polarity is charged depending on a display pattern and hence, the wiring delay of the gate signal line or the capacitance signal line is increased. Accordingly, it has been pointed out that when a square window pattern is displayed with respect to the background, a strip-like shadow which is referred to as a so-called crosstalk occurs in the direction of the gate signal line or the capacitance signal line.

On the other hand, in the liquid crystal display device described in JP-A-2000-338462 which forms two thin film transistors in one pixel, a capacitance element having the structure which is formed by stacking one electrode and another electrode with an insulation film therebetween is provided. The liquid crystal display device having such a structure requires no capacitance signal line and hence, there is no possibility that the above-mentioned crosstalk is generated. However, the capacitance element is configured such that output voltages of two respective thin film transistors are merely connected to the above-mentioned respective electrodes. Accordingly, during the holding period in which a gate-OFF voltage is applied to the thin film transistor, the potential of the capacitance element assumes a floating state. In view of the above, it has been found that there may arise a drawback that the voltage value is not fixed and is changed corresponding to the parasitic capacitance between the potential of the capacitance element and the potential of the gate signal line or the like.

Particularly, it has become apparent based on an experiment which the inventors carried out that when the gate potential of the thin film transistor is changed from an ON state to an OFF state, there may arise a drawback that an operational point is worsened, that is, the electrode potential is remarkably lowered due to the parasitic capacitance generated between the gate electrode which is constituted of a portion of the gate signal line and a source electrode.

Assuming that the output voltages from the above-mentioned two thin film transistors are transmitted to the holding capacitance electrodes which are independent from each other and these holding capacitance electrodes are overlapped to the capacitance signal lines with an insulation film therebetween thus forming the capacitance element, the lowering of numerical aperture of the pixels is unavoidable.

The present invention has been made under such circumstances and an advantage of the present invention is to provide a liquid crystal display device which can eliminate the possibility of a drawback that an operational point is worsened due to the lowering of a potential of a pixel electrode when a gate potential of a thin film transistor is changed from an ON state to an OFF state.

To briefly explain the summary of representative inventions among the inventions disclosed in this specification, they are as follows.

(1)

In a liquid crystal display device according to the present invention, for example, which includes a first electrode to which a signal is supplied through a first switching element and a second electrode to which a signal is supplied through a second switching element in each pixel region on a substrate, wherein liquid crystal is driven in response to a potential difference between the first electrode and the second electrode, the improvement is characterized in that the first electrode is formed as one electrode of a first holding capacitance which is constituted by sandwiching an insulation film between the first electrode and a signal line and, the second electrode is formed as one electrode of a second holding capacitance which is constituted by sandwiching an insulation film between the second electrode and a signal line.

(2)

The liquid crystal display device according to the present invention is, for example, on the premise of the constitution (1), characterized in that the first electrode and the second electrode are formed of a light transmitting conductive film, the first electrode and the second electrode are formed as different layers by way of an insulation film, one electrode is formed on a most portion of the pixel region, and another electrode is formed of a group of electrodes which are overlapped to one electrode.

(3)

The liquid crystal display device according to the present invention is, for example, on the premise of the constitution (1) or (2), characterized in that a signal line which constitutes another electrode of the first holding capacitance is a first drain signal line, and a signal line which constitutes another electrode of the second holding capacitance is a second drain signal line.

(4)

The liquid crystal display device according to the present invention is, for example, on the premise of the constitution (1) or (2), characterized in that a signal line which constitutes another electrode of the first holding capacitance and a signal line which constitutes another electrode of the second holding capacitance are formed of a capacitance signal line.

(5)

The liquid crystal display device according to the present invention is, for example, on the premise of the constitution (4), characterized in that a capacitance value of the first holding capacitance is substantially equal to a capacitance value of the second holding capacitance.

(6)

The liquid crystal display device according to the present invention is, for example, on the premise of the constitution (5), characterized in that the first electrode and the second electrode are formed of a light transmitting conductive film, the first electrode and the second electrode are formed on different layers by way of an insulation film, one electrode is formed on a most portion of the pixel region, and another electrode is formed of a group of electrodes which are overlapped to one electrode.

(7)

In a liquid crystal display device according to the present invention, for example, which includes a first electrode to which a signal is supplied from a first drain signal line through a first switching element and a second electrode to which a signal is supplied from a second drain signal line through a second switching element in each pixel region on a substrate, wherein liquid crystal is driven in response to a potential difference between the first electrode and the second electrode, the improvement is characterized in that the first electrode and the second electrode are formed on different layers by way of an insulation film with respect to the first drain signal line and the second drain signal line, and portions of the first electrode and the second electrode are overlapped to the first drain signal line and the second drain signal line.

(8)

The liquid crystal display device according to the present invention is, for example, on the premise of the constitution (7), characterized in that the first electrode has portions thereof overlapped to the first drain signal line and the second drain signal line respectively, and the second electrode has portions thereof overlapped to the first drain signal line and the second drain signal line respectively.

(9)

The liquid crystal display device according to the present invention is, for example, on the premise of the constitution (8), characterized in that the portions of the first electrode which are overlapped to the first drain signal line and the portions of the second electrode which are overlapped to the first drain signal line are substantially at the same positions, and the portions of the first electrode which are overlapped to the second drain signal line and the portions of the second electrode which are overlapped to the second drain signal line are substantially at the same positions.

(10)

The liquid crystal display device according to the present invention is, for example, on the premise of the constitution (8) or (9), characterized in that the portions of the first electrode which are overlapped to the first drain signal line, the portions of the second electrode which are overlapped to the first drain signal line, the portions of the first electrode which are overlapped to the second drain signal line, and the portions of the second electrode which are overlapped to the second drain signal line respectively constitute holding capacitances.

(11)

The liquid crystal display device according to the present invention is, for example, on the premise of the constitution (8) or (9), characterized in that values of respective holding capacitances formed by the portions of the first electrode which are overlapped to the first drain signal line, the portions of the second electrode which are overlapped to the first drain signal line, the portions of the first electrode which are overlapped to the second drain signal line, and the portions of the second electrode which are overlapped to the second drain signal line fall all together within a scope of 50% to 200%.

(12)

The liquid crystal display device according to the present invention is, for example, on the premise of the constitution (11), characterized in that the capacitance value of the holding capacitance of the portions of the first electrode which are overlapped to the first drain signal line and the capacitance value of the holding capacitance of the portions of the first electrode which are overlapped to the second drain signal line are substantially equal and, at the same time, the capacitance value of the holding capacitance of the portions of the second electrode which are overlapped to the first drain signal line and the capacitance value of the holding capacitance of the portions of the second electrode which are overlapped to the second drain signal line are substantially equal.

(13)

The liquid crystal display device according to the present invention is, for example, on the premise of the constitution (8) or (9), characterized in that the portions of the first electrode which are overlapped to the first drain signal line and the portions of the second electrode which are overlapped to the first drain signal line as well as the portions of the first electrode which are overlapped to the second drain signal line and the portions of the second electrode which are overlapped to the second drain signal line are arranged in a staggered manner.

(14)

In a liquid crystal display device according to the present invention, for example, which includes a first electrode to which a signal is supplied from a first drain signal line through a first switching element and a second electrode to which a signal is supplied from a second drain signal line through a second switching element in each pixel region on a substrate, wherein liquid crystal is driven in response to a potential difference between the first electrode and the second electrode, the improvement is characterized in that the liquid crystal display device includes holding capacitance signal lines, the holding capacitance signal lines are overlapped to a plurality portions of the first electrodes by way of a first insulation film, and the holding capacitance signal lines are overlapped to the second electrodes at regions between a plurality portions of the first electrodes by way of a first insulation film and a second insulation film.

(15)

The liquid crystal display device according to the present invention is, for example, on the premise of the constitution (14), characterized in that with respect to overlapped areas where the holding capacitance signal line is overlapped with the first electrode and the second electrode, the overlapped area where the holding capacitance signal line is overlapped with the second electrode is larger than the overlapped area where the holding capacitance signal line is overlapped with the first electrode.

(16)

The liquid crystal display device according to the present invention is, for example, on the premise of the constitution (14), characterized in that the holding capacitance formed by the holding capacitance signal line and the first electrode and the holding capacitance formed by the holding capacitance signal line and the second electrode are substantially equal.

(17)

The liquid crystal display device according to the present invention is, for example, on the premise of any one of the constitutions (14), (15) and (16), characterized in that the first electrode and the second electrode are formed of a light transmitting conductive film, the first electrode and the second electrode are formed as different layers by way of an insulation film, one electrode is formed on a most region of the pixel region, and another electrode is formed of a group of electrodes which are overlapped to one electrode.

Here, the present invention is not limited to the above-mentioned constitutions and various modifications are conceivable without departing from the technical concept of the present invention.

DESCRIPTION OF THE PREFERRED EMBODIMENTS

A liquid crystal display device according to the present invention is explained hereinafter in conjunction with drawings.

Embodiment 1

Figure 3:
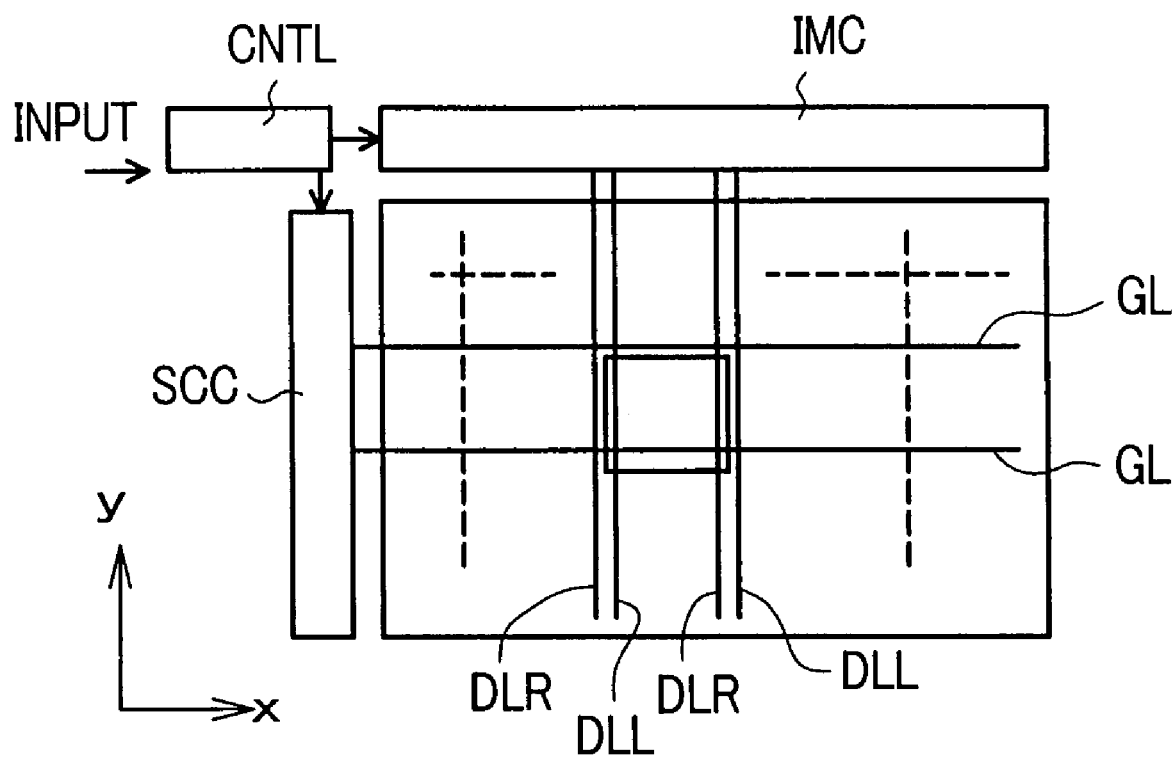
FIG. 3 is a plan view showing one embodiment of the liquid crystal display device according to the present invention.

FIG. 3 is a plan view showing one embodiment of a liquid crystal display device according to the present invention. On a liquid-crystal-side surface of one substrate GLS1 out of respective substrates which face each other in an opposed manner with liquid crystal therebetween, gate signal lines GL which extend in the x direction and are arranged in the y direction in parallel are formed. Further, on the liquid-crystal-side surface of one substrate GLS1, drain signal lines DL which extend in the y direction and are arranged in the x direction in parallel are formed.

These respective drain signal lines DL are repeatedly arranged such that the drain signal lines DL are arranged close to each other in the neighboring direction, the drain signal lines DL are arranged remote from each other in the neighboring direction, the drain signal lines DL are arranged close to each other in the neighboring direction, . . . . A rectangular region which is surrounded by a pair of neighboring gate signal lines GL and a pair of drain signal lines DL which are arranged remote from each other (a portion surrounded by a bold line in the drawing) constitutes a pixel region.

To each pixel region, a scanning signal is supplied from the gate signal line GL (for example, at a lower side in the drawing) which selects a group of pixels arranged in the x direction in parallel including a pixel in the pixel region. Further, a first video signal is supplied to the pixel from the drain signal line DL at the left side in the drawing (the first drain signal line DLL), while a second video signal is supplied to the pixel from the drain signal line DL at the right side in the drawing (the second drain signal line DLR). The detailed constitution of the pixel region is described in detail later.

The above-mentioned respective gate signal lines GL have, for example, one ends thereof connected to a scanning signal drive circuit SCC and a scanning signal is sequentially supplied to the pixels by the scanning signal drive circuit SCC. Further, the drain signal lines DL have, for example, one ends thereof connected to a video signal drive circuit IMC and the video signals are supplied to the pixels by the video signal drive circuit IMC at the timing of supplying of the scanning signal.

Here, the scanning signal drive circuit SCC and the video signal drive circuit IMC are driven in response to a signal transmitted from a controller CNTL and input signals such as a video signal and the like are supplied to the controller CNTL from the outside.

Figure 1:
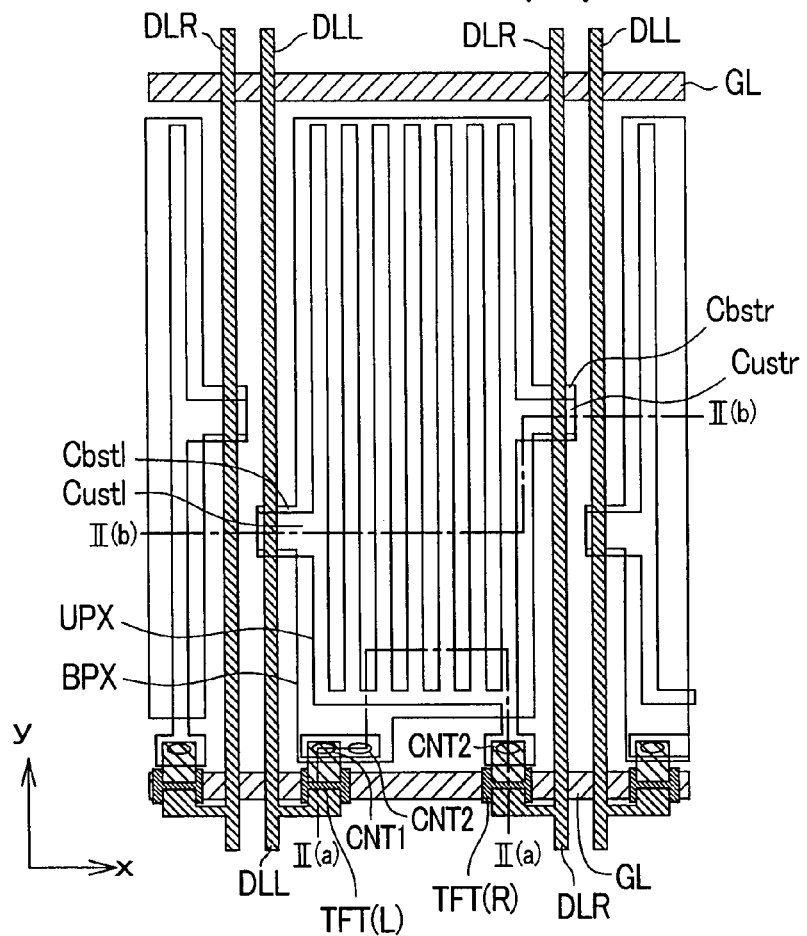
FIG. 1A is a plan view showing one embodiment of a pixel of a liquid crystal display device according to the present invention and FIG. 1B is an equivalent circuit diagram corresponding to FIG. 1A.
Figure 1:
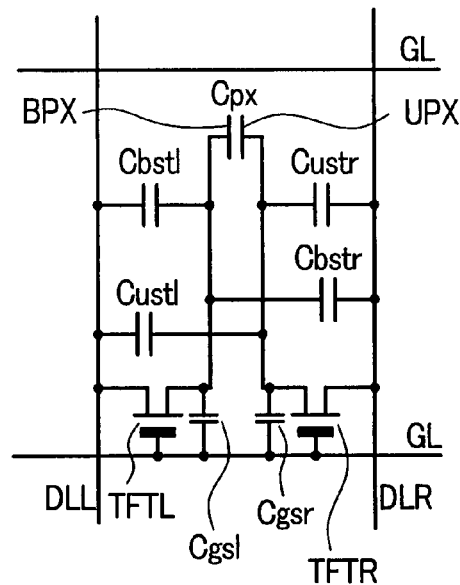

FIG. 1A is a plan view showing one embodiment of the constitution of the pixel region and FIG. 1B is an equivalent circuit diagram depicted corresponding to the constitution shown in FIG. 1A. FIG. 2A is a cross-sectional view taken along a line II(a)-II(a) in FIG. 1A and FIG. 2B is a cross-sectional view taken along a line II(b)-II(b) in FIG. 1A.

On the surface of the transparent substrate GLS1, the gate signal lines GL which extend in the x direction and are arranged in the y direction in parallel are formed. These gate signal lines GL are formed so as to surround the pixel region together with the first drain signal line DLL and the second drain signal line DLR described later.

With respect to the pixel region, a first pixel electrode BPX is formed over the most region except for a slight peripheral region in the vicinity of lines, that is, over the whole region of a center portion. On portions of respective sides of the first pixel electrode BPX which extend in the direction perpendicular to the gate signal lines GL, extension portions which extend parallel to the extending direction of the gate signal lines GL are formed, and these respective extension portions are formed to be overlapped with the first drain signal line DLL and the second drain signal line DLR described later.

The first pixel electrode BPX is, for example, formed of a light transmitting conductive layer and, as a material thereof, for example, ITO (Indium Tin Oxide), ITZO (Indium Tin Zinc Oxide), IZO (Indium Zinc Oxide), $SnO_2$ (Tin Oxide), $In_2O_3$ (Indium Oxide) or the like can be selected.

The extension portion of the first pixel electrode BPX formed at the left side in the drawing is configured to be overlapped to the first drain signal line DLL thus forming an electrode Cbstl which constitutes the holding capacitance. Further, the extension portion of the first pixel electrode BPX formed at the right side in the drawing is configured to be overlapped to the second drain signal line DLR thus forming an electrode Cbstr which constitutes the holding capacitance.

On a surface of the transparent substrate GLS1 on which the gate signal lines GL and the first pixel electrodes BPX are formed, a first insulation film GI is formed in a state that the first insulation film GI also covers the gate signal lines GL and the first pixel electrodes BPX.

Further, above an upper surface of the gate signal line GL which is arranged in the inside of the pixel region, two thin film transistors TFTL, TFTR which are spaced apart along the extending direction of the gate signal line GL are formed by way of the first insulation film GI. Here, one thin film transistor TFTL is referred to as the first thin film transistor and another thin film transistor TFTR is referred to as the second thin film transistor.

Both of the first thin film transistor TFTL and the second thin film transistor TFTR have the same cross-sectional structure, while their planer structures are arranged to be approximately symmetrical. Further, by forming a semiconductor layer AS on the first insulation film GI and by forming a drain electrode and a source electrode on the semiconductor layer AS, an MIS (Metal Insulator Semiconductor) transistor having the inverse staggered structure which adopts a portion of the gate signal line GL as the gate electrode and the first insulation film GI as a gate insulation film is formed.

The drain electrodes and the source electrodes of the first thin film transistor TFTL and the second thin film transistor TFTR are simultaneously formed along with the formation of the first drain signal lines DLL and the second drain signal lines DLR.

The drain electrode of the first thin film transistor TFTL is formed by extending a portion of the drain signal line DLL to a surface of the semiconductor layer AS, while a source electrode SD is formed in a spaced apart manner from the drain electrode by a length corresponding to a channel length of the first thin film transistor TFTL. The source electrode SD is formed such that the source electrode SD slightly extends into the inside of the pixel region to enable the connection of the source electrode SD with the first pixel electrode BPX. In the same manner, the drain electrode of the second thin film transistor TFTR is formed by extending a portion of the second drain signal line DLR to the surface of the semiconductor layer AS, while the source electrode SD is formed in a spaced apart manner from the drain electrode by a length corresponding to a channel length of the thin film transistor TFTR. The source electrode SD is formed such that the source electrode SD slightly extends into the inside of the pixel region for enabling the connection of the source electrode SD with the second pixel electrode UPX.

A second insulation film PAS is formed on the surface of the transparent substrate GLS1 in a state that the second insulation film PAS also covers the first thin film transistors TFTL and the second thin film transistors TFTR. The second insulation film PAS has a function of a protective film which prevents a direct contact of the above-mentioned respective thin film transistors TFT with the liquid crystal.

Then, on a surface of the second insulation film PAS, the second pixel electrodes UPX which are constituted of a group of a plurality of strip-like electrodes which extend in the y direction and are arranged in parallel in the x direction in the drawing, for example, are formed in a state that the second pixel electrodes UPX are overlapped to the first electrodes BPX, wherein the second pixel electrodes UPX are formed of a light transmitting conductive layer. Here, the extending direction of the group of the plurality of strip-like electrodes may be the x direction. Further, it may be possible to adopt the multi-domain constitution by providing a plurality of extending directions and making respective extending directions different from both of the x direction and the direction perpendicular to the x direction.

Here, an end portion at the thin film transistor TFTR side of the electrode which constitutes the second pixel electrode UPX has a portion thereof extended to a position above the source electrode SD of the second thin film transistor TFTR and is connected with the source electrode via a through hole CNT2 which penetrates the second insulation film PAS which is disposed below the second thin film transistor TFTR.

In this case, the connection of the source electrode SD of the above-mentioned first thin film transistor TFTL and the first pixel electrode BPX is performed through a contact hole CNT1 formed in the second insulation film PAS and a contact hole CNT2 formed in the second insulation film PAS and the first insulation film GI in a penetrating manner using a material layer SITO which is made of the same material as the second pixel electrode UPX. Due to such a constitution, a step of penetrating the first insulation film GI and a step of penetrating the second insulation film PAS can be performed as the same step thus realizing the reduction of the number of photolithography steps.

Further, among the group of electrodes which constitute the second pixel electrodes UPX, the electrode which is arranged close to the first drain signal line DLL is extended in a state that a portion thereof is overlapped to the first drain signal line DLL thus forming the holding capacitance Custl between the second pixel electrode UPX and the first drain signal line DLL. Further, the second pixel electrode UPX which is arranged close to the second drain signal line DLR is extended in a state that a portion thereof is overlapped to the second drain signal line DLR thus forming the holding capacitance Custr between the second pixel electrode UPX and the second drain signal line DLR.

Further, the above-mentioned holding capacitance Custl is formed at a portion substantially equal to a portion where the above-mentioned holding capacitance Cbstl is formed, while the above-mentioned holding capacitance Custr is formed at a portion substantially equal to a portion where the above-mentioned holding capacitance Cbstr is formed. This structure is provided for enhancing the capacitance stabilization effect.

Then, on the surface of the substrate GLS1 formed in this manner, an orientation film OIL is formed in a state that the orientation film OIL covers at least the whole pixel regions, wherein the orientation film OIL is brought into direct contact with liquid crystal so as to determine the initial orientation direction of the molecules of the liquid crystal.

In the liquid crystal display device having such a constitution, the pixel region is constituted of an inner region which is surrounded by the first drain signal line DLL, the second drain signal line DLR and the gate signal lines (scanning signal lines) GL.

With respect to operational voltages for display, a signal voltage of the above-mentioned first drain signal line DLL is applied to the first planer pixel electrode BPX which occupies the substantially whole region of the pixel area from the first thin film transistor TFTL through the contacts CNT1 and CNT2 during a period in which a gate ON voltage is applied to the gate signal line GL, that is, during the selection period. Further, in the same gate ON period as described above, a signal voltage of the second drain signal line DLR is applied to the second pixel electrode UPX from the second thin film transistor TFTR through the contact CNT2. Then, the liquid crystal is driven in response to the voltages from the above-mentioned first pixel electrode BPX and the second pixel electrode UPX.

Then, the first pixel electrode BPX and the second pixel electrode UPX are overlapped to each other by way of the first insulation film GI and the second insulation film PAS and the holding capacitance Cp is formed by the overlapped portion. Further, the first pixel electrode BPX extends to portions below the first drain signal line DLL and the second drain signal line DLR by way of the first insulation film GI thus forming the holding capacitance Cbstl and the holding capacitance Cbstr respectively. On the other hand, the second pixel electrode UPX extends to portions above the first drain signal line DLL and the second drain signal line DLR by way of the second insulation film PAS thus forming the holding capacitance Custl and the holding capacitance Custr respectively.

FIG. 1B is an equivalent circuit diagram which is depicted corresponding to the above-mentioned constitution, wherein Cgsl, Cgsr respectively indicate the parasitic capacitance of the first thin film transistor TFTL and the parasitic capacitance of the second thin film transistor TFTR.

Figure 4:
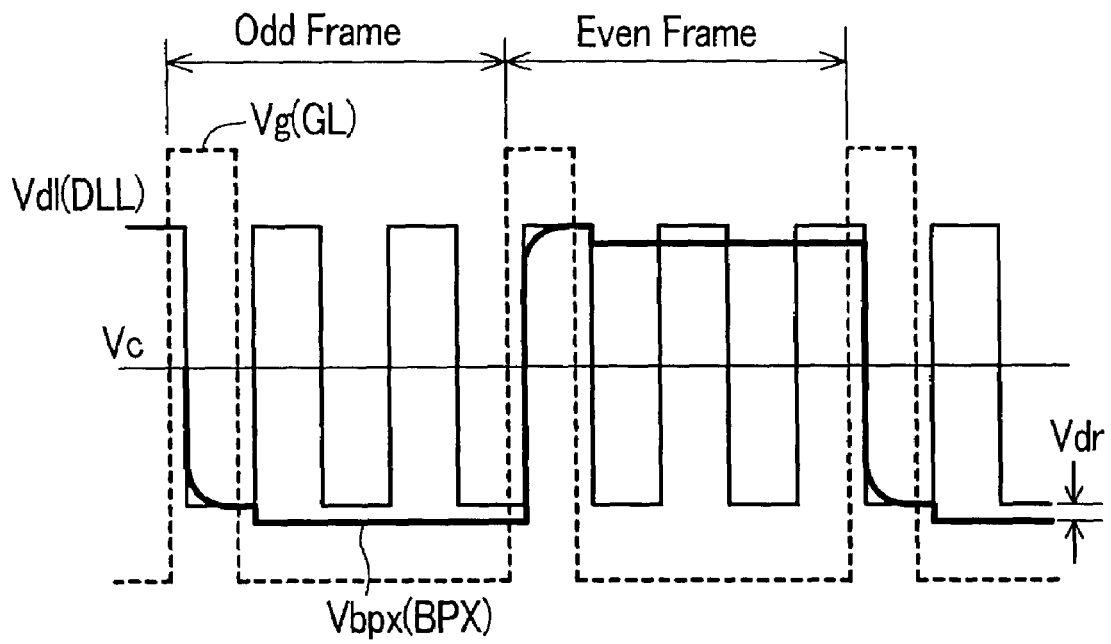
FIG. 4A and FIG. 4B are waveform charts and timing charts of signals supplied to pixels of the liquid crystal display device according to the present invention
Figure 4:
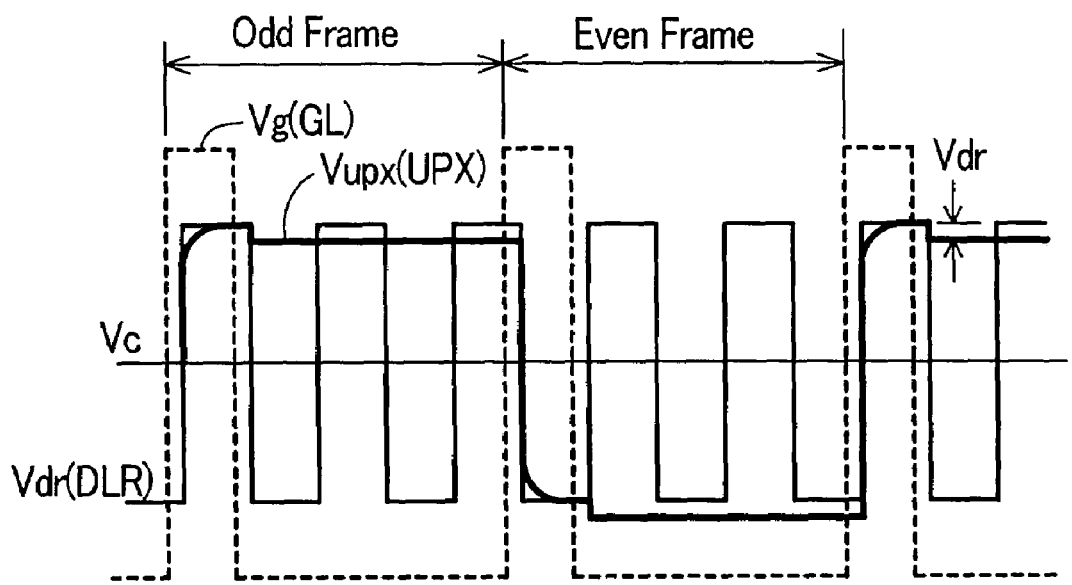

FIG. 4A and FIG. 4B show drive waveforms of respective signals supplied to the pixels having the above-mentioned constitution. Using these drive waveforms, effects which the above-mentioned holding capacitances Cbstl, Custl, Cbstr, Custr are expected to perform are explained.

FIG. 4A is a view showing drive waveforms of the above-mentioned first thin film transistor TFTL and FIG. 4B is a view showing drive waveforms of the above-mentioned second thin film transistor TFTR.

Scanning (gate) voltages Vg in FIG. 4A and FIG. 4B are in common and, in respective drawings, a voltage Vdl of the first drain signal line DLL and a voltage Vdr of the second drain signal line DLR are explicitly shown. Further, in respective drawings, the source voltage Vbpx of the first pixel electrode BPX and the source voltage Vupx of the second pixel electrode UPX which are outputs of the first thin film transistor TFTL and the second thin film transistor TFTR are also explicitly shown.

The source voltages Vbpx, Vupx generate a voltage drop ($\Delta$Vb) as shown in the following formula 1when the gate voltage Vg is lowered from an ON state to an OFF state.

$$\Delta bV = (Cgsl + Cgsr)/(Cbstl + Custl + Cbstr + Custr + Cgsl + Cgsr) \times gV \quad \text{(equation 1)}$$

As can be clearly understood from the equation 1, the pixel capacitance Cp is not included in the above-mentioned lowered voltage. This is because that when two thin film transistors TFT are formed in one pixel, the pixel capacitance Cp assumes a floating potential and does not affect the above-mentioned voltage drop. Further, when the holding capacitances Cbstl, Custl, Cbstr, Custr are not provided between the above-mentioned respective drain signal lines DL, the value of the voltage drop becomes equal to Vg and the source potential becomes equal to or lower than the OFF voltage of the gate thus giving rise to an erroneous operation.

On the other hand, as can be clearly understood from FIG. 4A and FIG. 4B, one signal line voltage Vdl and the other signal line voltage Vdr are always set symmetrical with respect to the reference voltage Vc and hence, when four holding capacitance values, that is, Cbstl, Custl, Cbstr, Custr can be set to the substantially equal value, the source voltages Vbps, Vupx are operated in a stable manner with respect to the drain voltage amplitude.

Figure 2:
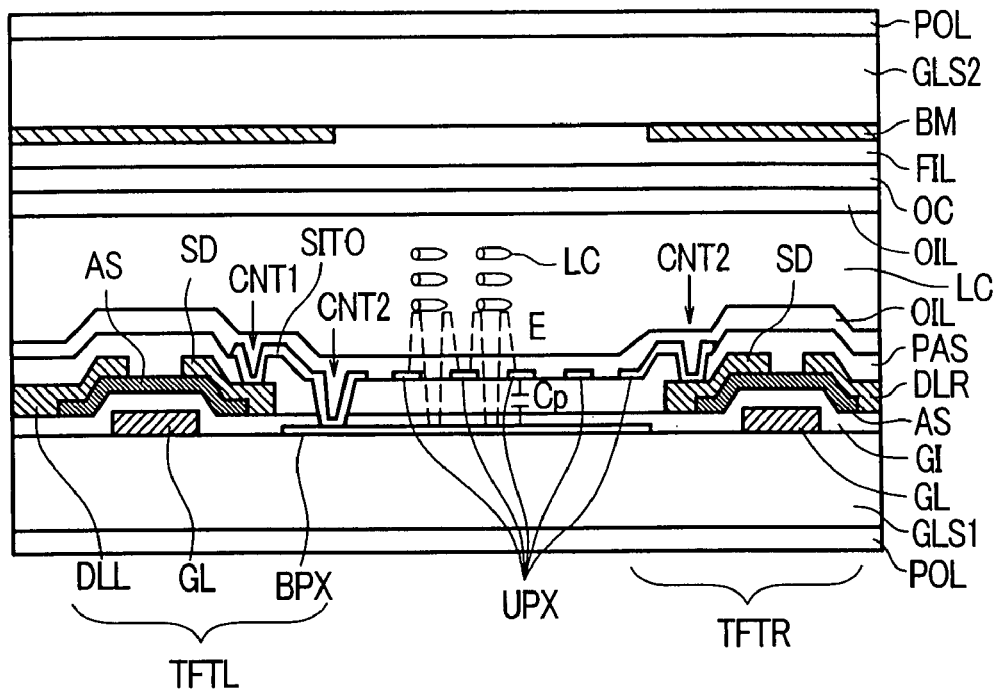
FIG. 2A is a cross-sectional view taken along a line II(a)-II (a) in FIG. 1A
FIG. 2B is a cross-sectional view taken along a line II(b)-II(b) in FIG. 1A.
Figure 2:
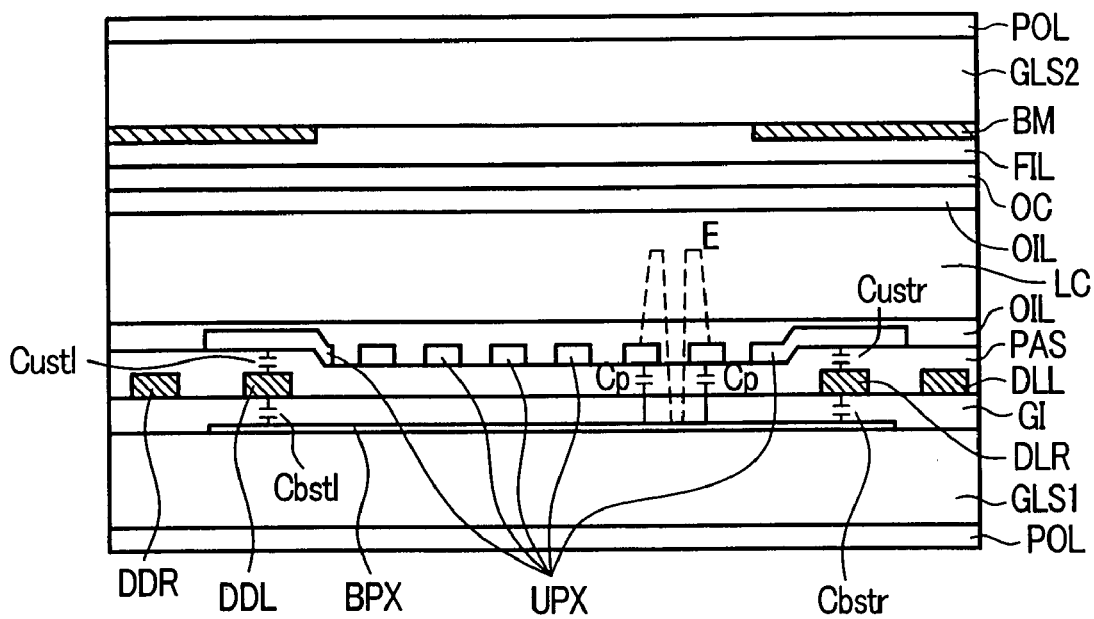

Such an operation is explained in detail further in conjunction with the cross-sectional view shown in FIG. 2.

First of all, in the cross-sectional view shown in FIG. 2A, when a so-called OFF gate signal is supplied to the gate signal line GL, charges stored in the first pixel electrode BPX and the second pixel electrode UPX assume a floating state.

That is, the first video signal from the first drain signal line DLL is supplied to the first pixel electrode BPX which occupies approximately the whole region of the pixel region through the TFTL and via a contact hole CNT1 and a contact hole CNT2. On the other hand, the second video signal from the second drain signal line DLR is supplied to the second pixel electrode UPX from the contact hole CNT2 through the TFTR.

An electric field is generated based on the voltage difference between the first pixel electrode BPX and the second pixel electrode UPX. Accordingly, the transmissivity of the liquid crystal LC is changed corresponding to the voltage difference. Since the second pixel electrode UPX is overlapped to the first pixel electrode BPX, with a stacked film constituted of the first insulation film GI and the second insulation film PAS sandwiched therebetween, the pixel capacitance Cp is formed in the overlapped portion. Since this overlapped portion has no overlapping relationship with other lines, for example, the gate signal line GL, the first drain signal line DLL and the second drain signal line DLR, when the TFTL and the TFTR are set to an OFF state, the charge stored in this capacitance Cp assumes a floating state.

FIG. 2B shows the constitutions of the holding capacitance elements Custl, Cbstl, Custr and Cbstr.

First of all, as described previously, the signal voltage of the first drain signal line DLL is transmitted to the first pixel electrode BPX and the signal voltage of the second drain signal line DLR is transmitted to the second pixel electrode UPX.

The above-mentioned first pixel electrode BPX extends in a state that a portion of one side thereof is overlapped to the first drain signal line DLL and a portion of another side thereof is overlapped to the second drain signal line DLR by way of the first insulation film GI. Due to such a constitution, the first pixel electrode BPX forms the holding capacitance Cbstl at a crossing portion of the first pixel electrode BPX and the first drain signal line DLL and forms the holding capacitance Cbstr at a crossing portion of the first pixel electrode BPX and the second drain signal line DLR.

Here, the first pixel electrode BPX extends without being overlapped to the second drain signal line DLR in the pixel region neighboring to the left side of the first drain signal line DLL and the first pixel electrode BPX also extends without being overlapped to the first drain signal line DLL in the pixel region neighboring to the right side of the second drain signal line DLR. This is because, when the pixel electrodes BPX are overlapped to the other drain signal lines supplying signals for other pixel regions, the first pixel electrode BPX receives the influence from other drain signal lines and hence, the holding potential is disturbed.

Further, the above-mentioned second pixel electrode UPX extends in a state that a portion of one side thereof is overlapped to the second pixel electrode UPX and a portion of another side is overlapped to the first drain signal line DLL by way of the second insulation film PAS. Accordingly, the holding capacitance Custl is formed at a crossing portion of the second pixel electrode UPX and the first drain signal line DLL and the holding capacitance Custr is formed at the crossing portion of the second pixel electrode UPX and the second drain signal line DLR.

Here, the second pixel electrode UPX extends without being overlapped to the second drain signal line DLR in the pixel region neighboring to the left side of the first drain signal line DLL and the second pixel electrode UPX extends without being overlapped to the first drain signal line DLL in the pixel region neighboring to the right side of the second drain signal line DLR. This is because, when the second pixel electrode UPX is overlapped to other drain signal lines supplying signals for other pixel region, the second pixel electrode UPX receives influence from other drain signal lines and hence, the holding potential is disturbed.

To explain the planar arrangement of the holding capacitances Custl and Cbstl which are formed in the vicinity of the above-mentioned first drain signal line DLL and the holding capacitances Custr and Cbstr which are formed in the vicinity of the above-mentioned second drain signal line DLR, as shown in FIG. 1A, the holding capacitances Custl and Cbstl and the holding capacitances Custr and Cbstr are arranged alternately to assume a mutually inserted state in a region defined between the drain signal lines arranged close to each other. Accordingly, the distance between the neighboring drain signal lines arranged close to each other can be decreased and hence, the numerical aperture can be enhanced. Further, the possibility that the short-circuiting is generated between the holding capacitances Custl and Cbstl and between the holding capacitances Custr and Cbstr can be easily eliminated.

On the other hand, it is favorable to set the respective values of holding capacitances Custl, Cbstl, Custr, Cbstr to the substantially same value. At least, it is desirable to make the values of the holding capacitances Custl, Cbstl, Custr, Cbstr fall altogether within a range of 50% to 200%. This can be realized, for example, by setting areas of crossing portions where the pixel electrode UPX or BPX and the drain signal line DLL or DLR cross each other substantially equal with respect to the holding capacitances Custl, Cbstl, Custr, Cbstr. The reason why such a constitution is desirable is explained hereinafter.

A large charge stored in the pixel capacitance Cp which is formed of the first pixel electrode BPX and the second pixel electrode UPX assumes a floating state when the scanning signal of the gate signal line GL which drives the first thin film transistor TFTL and the second thin film transistor TFTR is turned off.

Accordingly, for example, when only the holding capacitance Cbstl is formed between the first drain signal line DLL and the first pixel electrode BPX, during the holding period, the source potential of the first pixel electrode BPX is largely changed through the holding capacitance Cbstl corresponding to the potential of the first drain signal line DLL.

In driving the pixels according to this embodiment, amplitude of the video signal in the first drain signal line DLL and amplitude of the video signal in the second drain signal line DLR exhibit the same absolute value while the directions of the amplitudes are set opposite to each other. Therefore, by forming the holding capacitance Cbstr between the second drain signal line DLR and the first pixel electrode BPX, the change of the potential of the first pixel electrode BPX with respect to the amplitudes of the respective video signals can be suppressed.

In the same manner, by setting the holding capacitances Custl and Custr to the substantially same value for stabilizing the source potential of the second pixel electrode UPX, the operation of the second pixel electrode UPX can be stabilized.

EMBODIMENT 2.

Figure 5:
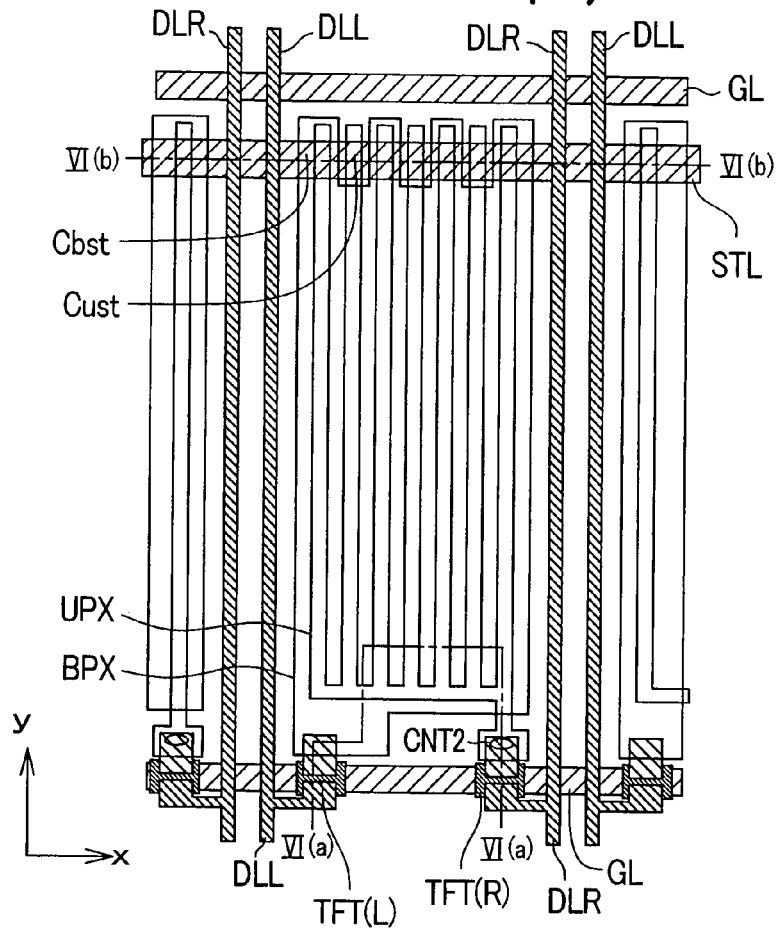
FIG. 5A is a plan view showing another embodiment of the pixel of the liquid crystal display device according to the present invention and FIG. 5B is an equivalent circuit diagram corresponding to FIG. 5A.
Figure 5:
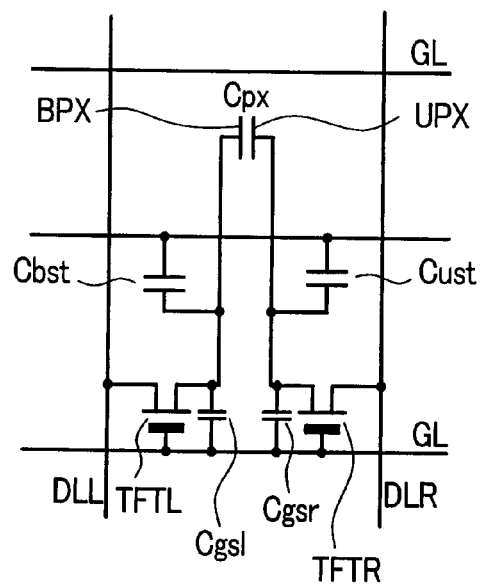

FIG. 5A is a plan view showing another embodiment of the constitution at the above-mentioned pixel region. Further, FIG. 5B is an equivalent circuit diagram depicted geometrically corresponding to the constitution shown in FIG. 1A. Further, FIG. 6A is a cross-sectional view taken along a line VI(a)-VI(a) in FIG. 5A and FIG. 6B is a cross-sectional view taken along a line VI(b)-VI(b) in FIG. 5A.

FIG. 5A is a view corresponding to FIG. 1A of the embodiment 1 and the constitution of FIG. 5A differs from the constitution of FIG. 1A in that holding capacitance signal lines STL are formed, and the holding capacitance signal line STL is used as another electrode of the holding capacitance Cbst which uses the first pixel electrode BPX as one electrode thereof and, further, the holding capacitance signal line STL is used as another electrode of the holding capacitance Cust which uses the second pixel electrode UPX as one electrode thereof.

Here, the holding capacitance signal lines STL are signal lines which are formed simultaneously at the time of forming the gate signal lines GL. Accordingly, this embodiment adopts the layered structure in which the first pixel electrode BPX is formed on a surface of the first insulation film GI covering the holding capacitance signal line STL and the second pixel electrode UPX is formed on a surface of the second insulation film covering the first pixel electrode BPX.

Then, the holding capacitance signal line STL is configured such that the region to which both of the first pixel electrode BPX and the second pixel electrode UPX are overlapped and the region to which only the second pixel electrode UPX is layered are alternately formed.

Here, the former region forms the holding capacitance Cbst which stabilizes the potential of the first pixel electrode BPX. On the other hand, the latter region forms the holding capacitance Cust which stabilizes the potential of the second pixel electrode UPX.

Figure 6:
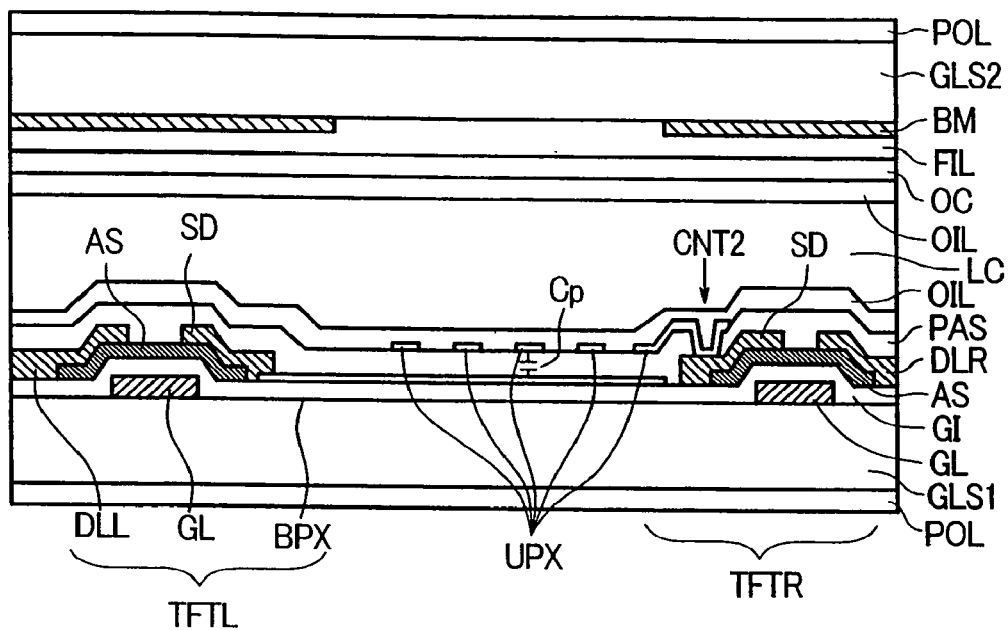
FIG. 6A is a cross-sectional view taken along a line VI(a)-VI (a) in FIG. 5A
FIG. 6B is a cross-sectional view taken along a line VI(b)-VI(b) in FIG. 5A.
Figure 6:
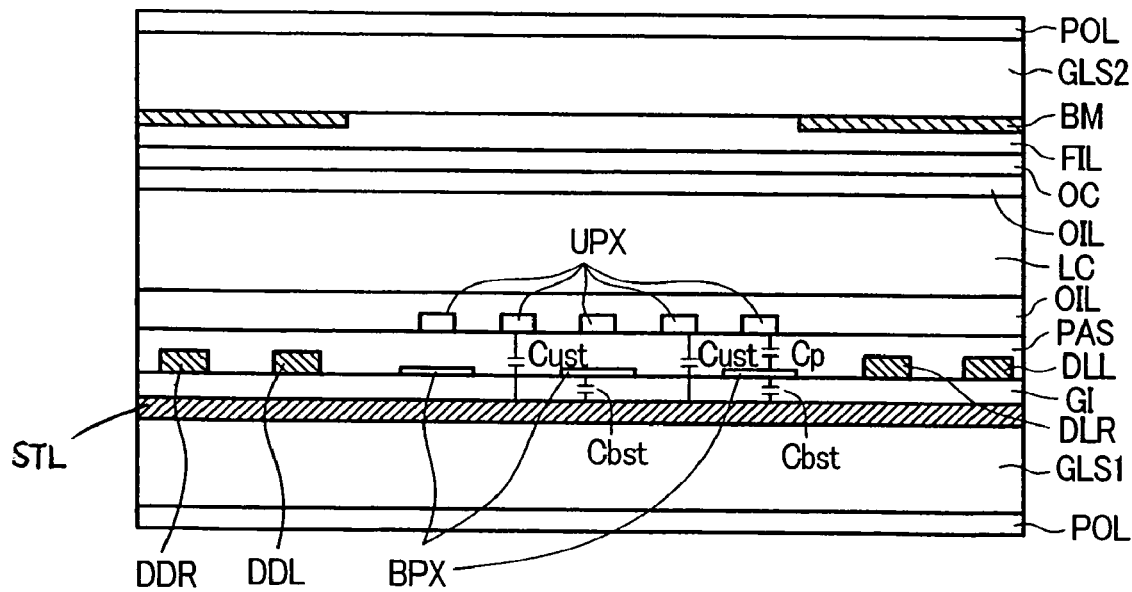

The constitution of this embodiment is further explained in detail in conjunction with a cross-sectional view shown in FIG. 6.

In FIG. 6A, with respect to the video signal from the first drain signal line DLL, when ON voltage (scanning signal) is applied to the gate signal line GL, the first thin film transistor TFTL is turned ON and the video signal is supplied to the first pixel electrode BPX through the source electrode SD thereof. On the other hand, the video signal from the second drain signal line DLR is, in the same manner, supplied to the second pixel electrode UPX through the source electrode SD thereof when the second thin film transistor TFTR assumes an ON state.

Since the first thin film transistor TFTL and the second thin film transistor TFTR are turned on in response to the same scanning signal (voltage), the video signals from the above-mentioned respective thin film transistors are charged to the pixel capacitance Cp which is formed of the second pixel electrode UPX, the first pixel electrode BPX and the second insulation film PAS.

Further, in FIG. 6B, the holding capacitance signal line STL is formed on the same layer on which the gate signal line GL is formed, while between the first pixel electrode BPX and the second pixel electrode UPX which are formed above the holding capacitance signal line STL, along the running direction of the holding capacitance signal line STL, the holding capacitance Cust and the holding capacitance Cbst are alternately formed. This structure is adopted due to the following reason.

The first pixel electrode BPX is formed on the whole region of the center portion of the pixel region except for the slight periphery of the pixel region. When the first pixel electrode BPX extends over the holding capacitance signal line STL by way of the first insulation film GI, only the holding capacitance with respect to the first pixel electrode BPX is formed and, hence, when the scanning signal is lowered from the ON state to the OFF state, an operational point of the second pixel electrode UPX is lowered due to the influence of the parasitic capacitance.

Accordingly, in the above-mentioned first pixel electrode BPX which is disposed above the holding capacitance signal line STL, a plurality of notches which are arranged in parallel along the running direction of the holding capacitance signal line STL are formed, wherein the holding capacitance Cbst is formed at portions of the first pixel electrode BPX where notches are not formed and, at the same time, the second pixel electrode UPX extends in the notched portions and the holding capacitance Cust is formed between the extended portions and the above-mentioned holding capacitance signal line STL.

Here, by setting the capacitance values of the holding capacitance Cust and Cbst to the substantially equal value, the most stabilized operation is realized. Since the thickness of the insulation film sandwiched between the first pixel electrode BPX and the holding capacitance signal line STL and the thickness of the insulation film sandwiched between the second pixel electrode UPX and the holding capacitance signal line STL are different, in setting the above-mentioned capacitance values, it is desirable to adjust the crossing area of the first pixel electrode BPX and the holding capacitance signal line STL and the crossing area of the second pixel electrode UPX and the holding capacitance signal line STL respectively. With respect to the crossing areas, it is desirable to increase the area of the second pixel electrode UPX above the holding capacitance signal line than to increase the area of the un-notched portion of the first pixel electrode BPX. More simply, it is desirable to increase a width of the second pixel electrode UPX above the holding capacitance signal line than to increase a width of the non-notched portion of the first pixel electrode BPX.

Accordingly, in this embodiment, the crossing area of the second pixel electrode UPX and the holding capacitance signal line STL is set larger than the crossing area of the first pixel electrode BPX and the holding capacitance signal line STL.

Embodiment 3

Figure 7:
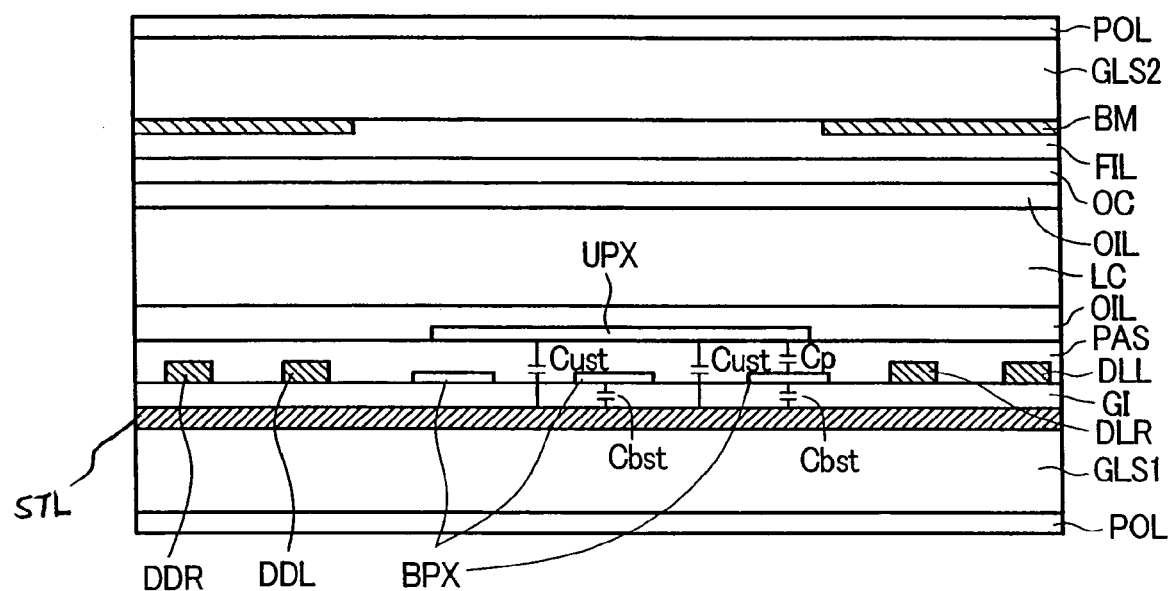
FIG. 7 is a cross-sectional view showing another embodiment of the pixel of the liquid crystal display device according to the present invention.

FIG. 7 is a cross-sectional view showing another embodiment of the constitution at the above-mentioned pixel region and corresponds to FIG. 6B.

The constitution shown in FIG. 7 differs from the constitution shown in FIG. 6B in that the second pixel electrodes UPX are connected to each other along the running direction of the holding capacitance signal line STL above the holding capacitance signal line STL. In the same manner as the embodiment shown in FIG. 6B, in portions except for portions where the second pixel electrode UPX is overlapped to the holding capacitance signal line STL and in the vicinity of the overlapped portion, the above-mentioned second pixel electrode UPX is constituted of a group of electrodes which is constituted of a plurality of electrodes arranged in parallel.

Accordingly, while the portions of the second pixel electrode UPX which are overlapped with the first pixel electrode BPX are formed above the holding capacitance signal line STL, in the portions of the second pixel electrode UPX which are not overlapped to the first pixel electrode BPX, the holding capacitance Cust is formed between the second pixel electrode UPX and the holding capacitance signal line STL.

Here, the holding capacitance Cust is configured such that the overlapped area of the holding capacitance signal line STL and the second pixel electrode UPX can be increased, the capacitance value of the holding capacitance Cust can be increased.

Accordingly, in setting the holding capacitance Cust to a given value, a line width of the holding capacitance line STL can be narrowed and hence, the numerical aperture of pixel can be enhanced.

That is, the holding capacitances Cbst and Cust can be alternately arranged without gaps along the running direction of the holding capacitance signal line STL and hence, the designing necessary for setting the capacitance values of the respective holding capacitances Cbst and Cust to the same value is facilitated. Further, it is needless to say that the number of notches formed in the first pixel electrode BPX is not specifically limited in this embodiment.

The above-mentioned respective embodiments may be used in a single form or in combination. This is because that the advantageous effects of the respective embodiments can be obtained singly or synergistically.

As can be clearly understood from the constitution explained heretofore, according to the liquid crystal display device of the present invention, when the gate potential of the thin film transistor is changed from the ON state to the OFF state, it is possible to eliminate the drawbacks such as the deterioration of operational points which remarkably lowers the potential of the pixel electrode.

What is claimed is:

1. A liquid crystal display device which having a plurality of pixel regions, each of the pixel regions comprising:
    a first electrode connected to a first switching element which is connected to a first drain signal line;
    a second electrode connected to a second switching element which is connected to a second drain signal line; and
    a capacitance signal line, wherein
    the first switching element and the second switching element are connected to a gate signal line,
    the first electrode overlaps with the capacitance signal line in a plan view such that a first holding capacitance is formed in-between, and
    the second electrode overlaps with the capacitance signal line in the plan view such that a second holding capacitance is formed in-between, wherein liquid crystal is driven in response to a potential difference between the first electrode and the second electrode.

2. A liquid crystal display device according to claim 1, wherein a capacitance value of the first holding capacitance is substantially equal to a capacitance value of the second holding capacitance.

3. A liquid crystal display device according to claim 2, wherein the first electrode and the second electrode are formed of a light transmitting conductive film,
    the first electrode and the second electrode are formed as different layers,
    the first electrode is plate-shaped, and the second electrode is comb-shaped.

4. A liquid crystal display device which having a plurality of pixel regions, each of the pixel regions comprising:
    a first pixel electrode connected to a first switching element which is connected to a first drain signal line;
    a second pixel electrode connected to a second switching element which is connected to a second drain signal line; and
    a capacitance signal line,
    wherein the first switching element and the second switching element are connected a gate signal line,
    the capacitance signal line is overlapped with a plurality portions of the first pixel electrode in a plan view, and
    the capacitance signal line is also overlapped with a portion of the second pixel electrode in the plan view, wherein liquid crystal is driven in response to a potential difference between the first pixel electrode and the second pixel electrode.

5. A liquid crystal display device according to claim 4, wherein
    an area of the overlapped portion of the capacitance signal line and the second pixel electrode is larger than a sum of areas of the overlapped portions of the capacitance signal line and the first pixel electrode.

6. A liquid crystal display device according to claim 4, wherein the second pixel electrode is formed with a plurality of slits, the first pixel electrode is formed without any slit.

* * * * *